United States Patent

Miler

[15] 3,673,298
[45] June 27, 1972

[54] METHOD FOR COOLING PELLETS SEVERED FROM EXTRUDED PLASTIC STRANDS

[72] Inventor: Richard W. Miler, Saginaw, Mich.
[73] Assignee: Baker Perkins Inc., Saginaw, Mich.
[22] Filed: June 11, 1970
[21] Appl. No.: 57,874

Related U.S. Application Data

[62] Division of Ser. No. 743,783, July 10, 1968, Pat. No. 3,608,142.

[52] U.S. Cl. ............................................................264/142
[51] Int. Cl. ..........................................................B01j 2/20
[58] Field of Search.....................264/143, 142, 141; 18/12 A

[56] References Cited

UNITED STATES PATENTS 3,415,917  12/1968  Watanabe et al. ......................264/142
3,324,510  6/1967   Kleeb....................................264/141
3,564,650  2/1971   Irving....................................18/2.4

Primary Examiner—Robert F. White
Assistant Examiner—J. R. Hall
Attorney—Learman, Learman & McCulloch

[57] ABSTRACT

A method of cooling pellets severed from extruded plastic strands, the cooling being effected by collecting the pellets in a rotating housing to which cooling liquid is supplied in a manner to form a centrifugally maintained pellet collecting, coolant annulus moving as a stream in a spiral path axially away from a die through which the strands are extruded.

6 Claims, 2 Drawing Figures

PATENTED JUN 27 1972 3,673,298

INVENTOR
RICHARD W. MILER
BY his attorneys
Learman, Learman & McCulloch

METHOD FOR COOLING PELLETS SEVERED FROM EXTRUDED PLASTIC STRANDS

This is a division of U.S. Pat. application Ser. No. 743,783, filed July 10, 1968 now U.S. Pat. No. 3,608,142.

One of the prime objects of the invention is to provide an improved method for cooling pellets which are manufactured in apparatus described in the instant assignee's co-pending application Ser. No. 688,398, filed Dec. 6, 1967, and entitled Apparatus for Extruding Strands and Cutting Them Up Into Pellets now U.S. Pat No. 3,564,650.

A further object of the invention is to provide a method of the character described wherein centrifugal forces are utilized to keep the pellets immersed in a stream of water which moves in a generally axial direction away from the extruding die and toward a discharge housing.

Another object of the invention is to provide a method of cooling wherein the pellets are moved in a generally spiral path in the pellet trapping housing rather than directly down the length thereof, and thus remain in the coolant stream for a greater length of time.

Another object of the invention is to provide a method of cooling which may be used with all types of plastic materials including polypropylene, without utilizing water or another coolant at the die face as in the conventional in-line underwater cutter.

Still another object of the invention is to provide a highly reliable and less expensive pelleting and pellet cooling system which requires less floor space than conventional systems and does not require that a bearing housing be in a zone of high heat or attached directly to the extruder barrel.

Other objects and advantages of the invention will be pointed out specifically or will become apparent from the following description when it is considered in conjunction with the appended claims and the accompanying drawings, in which:

Figure 1:
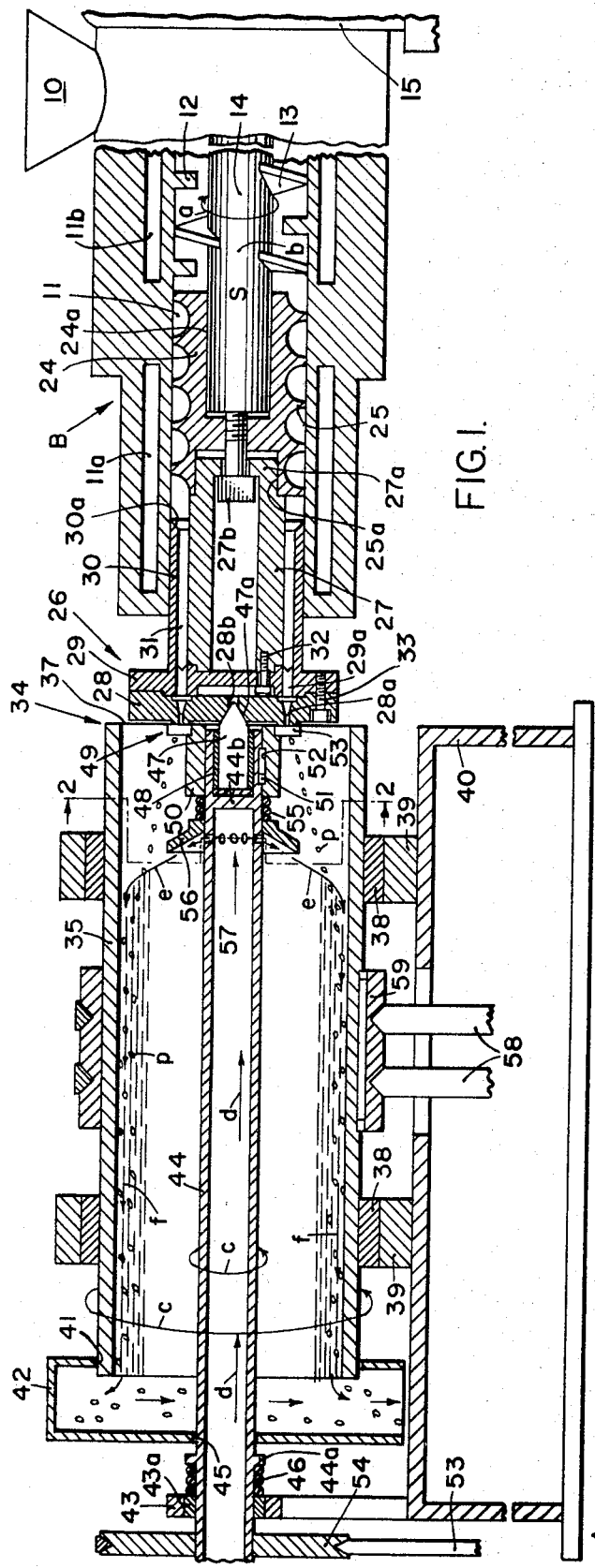
FIG. 1 is a sectional, side elevational view of the apparatus.
Figure 2:
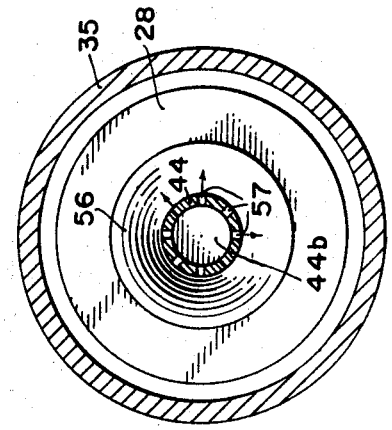
FIG. 2 is an enlarged, fragmentary, transverse sectional view taken on the line 2—2 of FIG. 1.

Referring now particularly to the accompanying drawings in which I have shown a preferred embodiment of the invention only, a letter B generally refers to a jacketed, tubular mixing barrel which may include annular passages 11a and 11b for circulating a temperature maintaining heating or cooling fluid, depending on the mixing operation to be performed. A mixer of this general character is disclosed in the aforementioned application and in the present assignee's U.S. Pat. No. 3,023,455, granted Mar. 6, 1962 to Herbert F. Geier and Henry F. Irving, and the present machine similarly includes a feed hopper 10 leading into the chamber or bore 11 of the barrel B for delivering the ingredients to be mixed to the chamber 11. Normally the plastic material to be pelletized will be fed to the hopper 10 in the form of plastic beads and will be heated in the barrel 11 to its melting temperature.

Provided in the barrel B are circumferentially spaced radially inwardly projecting teeth or lugs 12 of the character disclosed in the patent mentioned, which cooperate with interupted helical threads or blades 13 provided on a portion 14 of a mixer shaft generally designated S in helical formation in a manner to achieve the intimate blending and kneading of the material introduced to the chamber 11 through hopper 10. The threads or flight sections 13 are so pitched that if the shaft S is revolved in a clockwise direction as viewed from the right end of the machine (See the arrow a), the material will be moved forwardly from right to left, it being understood that shaft S is simultaneously reciprocated in timed relation with its rotation and the disposition of teeth 12 so that during the stroke of the shaft S, the teeth 12 pass through the spaces b between the interrupted blades 13. It may be assumed that the blades which form the thread portions 13 are interrupted at 180° intervals, and the shaft then, of course, must rotate 180° during both the forward and rearward portions of the reciprocatory stroke. Provided to drive the shaft S in a rotary and reciprocating stroke is a motor and cam assembly generally designated 15 of the same type shown in the aforementioned patent and patent application and in view of this, it is deemed unnecessary to present a specific disclosure thereof herein.

At its front end, the shaft portion 14 mounts an advancing screw section 24, also forming part of shaft S, and having flights 25 which move the plasticized material forwardly in the same manner as do the flights 13. It will be observed that section 24 has a bore 24a within which the end of shaft portion 14 is received. Mounted on the front end of the advancing screw section 24 is an extruding head assembly generally designated 26, also forming part of the shaft S, and reciprocating and revolving therewith which includes a sleeve member 27 having a reduced end portion 27a, received in a recess 25a in the front end of the screw section 24 and secured by a bolt 27b which extends into the shaft section 14.

The assembly 26 includes a pair of die plates 28 and 29 which cooperate to discharge the material in the form of strands and are provided with communicating, circumferentially spaced material expressing passages 28a and 29a respectively. It will be observed that the plate 29 has a rearwardly extending sleeve extension 30 which is spaced from the sleeve 27 to provide an annular passage 31 leading to the extruding orifices formed by openings 28a and 29a. The rear portion of the sleeve extension 30 is beveled as at 30a to direct the plasticized material inwardly to the chamber 31. Bolts 32 may be provided to secure the plate 29 to the sleeve 27 and bolts 33 may be provided to secure the plate 28 to the plate 29. Because the chamber 31 reciprocates with the screw section 24 and shaft section 14, material is expressed through the exit orifices 28a in a steady stream rather than in a pulsating stream.

Mounted forwardly of the extruding head 26 which extrudes the strands of plastic material, is a strand cutting and pellet cooling assembly generally designated 34, which includes an outer surrounding cylindrical housing 35 having an end opening 37 which permits reciprocation and rotation of extruding head 26 therein. The housing 35 is rotatably supported by bearings 38 mounted by bearing supports 39 on a support base 40 and its forward end is rotatably received within a bore 41 provided in a stationary discharge housing 42. It will be seen that base 40 also mounts a bearing support 43 for the front end of an elongated, cutting knife carrying, tubular shaft 44 which is supported at its opposite end by the extruding assembly 26, the shaft 44 extending freely through an opening 45 provided in the one wall of the discharge housing or chute 42 as shown. The bearing 43a supports the shaft 44 for rotation and reciprocation and a return spring 46 is provided between a flange 44a on the shaft 44 and axially fixed bearing 43 as shown.

It will be observed that the shaft 44 is interiorly partitioned as at 44b and rotatably mounts a center member 47 journaled in a bearing sleeve 48. The one end of the center member 47 is tapered as at 47a and rotatably received in a "center" opening 28b provided centrally in the die plate 28. Mounted on the shaft 44 for rotary movement therewith and sliding movement thereon is a cutting knife assembly generally designated 49 which includes a knife holding sleeve 50 with a key 51 received in an elongated slot 52 which permits axial movement of the knife assembly 49. The cutting knives 53, which are carried by the sleeve 50, are revolved past the orifices 28a in a direction counter to the rotation of shaft S as in the aforementioned application and may be of exactly the construction described in that application. The shaft 44 may be driven by a belt 53 in a direction "c" counter to the direction of revolution of shaft S via a sheave 54 and reciprocates with shaft S. The knife holder sleeve 50 is, as noted mounted for axial movement on the shaft 44 if it should be necessary such as when a foreign body jams between the knife blades 53 and the die face of the plate 28, coil spring 55 being provided, however, to normally bear against the sleeve 50 and maintain the cutting edges of the knife blades 53 in engagement with the face of die plate 28.

Provided forwardly of the cutting knife assembly 49 is a radially angularly disposed deflector or baffle plate 56 for directing a suitable coolant fluid such as water, centrifugally expressed through circumferentially spaced ports 57 provided in the shaft 44. The baffle disk 56 also functions as a fixed base or spring support for spring 55. Provided to revolve the pellet collecting housing 35 counter to the direction of rotation $a$ of shaft S are belts 58 which drive the cylindrical housing 35 via a sheave 59 at a speed which develops considerable centrifugal forces.

In operation plastic material to be pelletized is supplied to the mixer chamber 11 through the hopper 10 in any suitable manner, but usually in particulate form and then is melted within the chamber 11 and continuously mixed and kneaded therein. Typical plastics which may be processed are polyethylene, polyvinyl chloride, polystyrene, polyurethane and polypropylene, but many plastics and other materials may also be suitably processed by the apparatus. The chamber 11 will be maintained at the extruding temperature of the material by circulating a heating medium through the jacket chambers 11a and 11b and the plastic material will be forwarded continuously by the flights 13 and advancing screw portion 24 to the chamber 31 and out the aligned orifices 29a and 28a in the form of continuous strands.

The knife blades 53, which are rotated at a high rate of speed in the direction $c$, counter to the direction of rotation $a$ of the shaft S and die plates 28 and 29, hurl the plastic pellets through the coolant fluid curtain formed by the expressing orifices 57 in shaft 44 and the baffle deflector plate 56 to the interior surface of the rotating pellet collecting housing 35. Coolant fluid, being fed in through the shaft 44 continuously in the direction of the arrows $d$, is centrifugally expressed outwardly through ports 57 and is deflected by the annular baffle 56 to form the radially and forwardly inclined curtain $e$ which then is centrifugally maintained as a moving stream $f$ of some depth on the interior of the rotating housing 35. Thus, because of the speed of rotation of housing 35, a tubular annulus of a suitable coolant such as water is formed at the interior wall of the housing 35 and moves forwardly in a spirally flowing stream which may make several complete revolutions before reaching the discharge housing 42. The centrifugal force involved is sufficient not only to maintain the hollow annulus of coolant but also to maintain the heavier pellets in submerged condition within the forwardly moving annulus stream. Because the pellets $p$ pass immediately through the fluid curtain $e$ and are immersed in the stream $f$, they are cooled sufficiently to prevent their agglomeration in the housing 35 and after they are discharged to the housing 42.

The shaft 44 rotates in the opposite direction $c$, while reciprocating with the extruding head assembly 26, as does the knife assembly 49. With the direction of rotation of the knife assembly 49 opposite to the rotation of the extrusion head assembly 26 a proper trajectory for the pellets $p$ cut off is achieved which passes them in the path shown in FIG. 1. The spring 46 is compressed, when the knife assembly 49 and shaft 44 are moved forwardly from right to left in FIG. 1 with the extruding head 26 and shaft S, and operates to return the shaft 44 when the shaft S returns in the left to right direction in FIG. 1. Because the baffle 56 directs the coolant curtain $e$ in a forward as well as a radial direction, the coolant is prevented from reaching the die plate 28 and affecting the necessarily uniform temperatures which must be maintained at the expressing orifices 28a and 29a.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A method of pelletizing extrudable material comprising the steps of: axially extruding material strands at an elevated temperature from a die along an axis; cutting the strands into pellets; supplying a liquid coolant to a pellet housing and rotating the housing about an axis generally aligned with the extrusion axis to cause the liquid coolant to form an axially proceeding spiral stream, and introducing the pellets into said spiral stream to flow therewith and cool.

2. The method set forth in claim 1 wherein said supplying step is accomplished by centrifugally maintaining a generally radial curtain of liquid coolant leading radially outwardly to said housing; and said introducing step is accomplished by the cutting which hurls the pellets through said curtain and into said axially proceeding spiral stream.

3. A method of pelletizing extrudable material comprising the steps of: extruding material strands at an elevated temperature from a die; maintaining a rotating liquid coolant annulus in an area spaced outwardly from the die and having an axis generally axially aligned with the die; maintaining a generally radial curtain of liquid coolant leading to said annulus; and cutting said strands into pellets and hurling them on a trajectory radially and outwardly from the die through said radial curtain to said annulus of coolant to be carried thereby so as to cool the pellets.

4. The method of claim 3 wherein said step of maintaining said radial curtain is accomplished by axially directing said stream of coolant and then radially deflecting said coolant.

5. The method of claim 4 wherein said coolant is initially directed in an axial path toward said extrusion die.

6. The method of claim 3 wherein the area in which the coolant annulus is maintained is axially forwardly of said die, and the pellets are hurled forwardly to said annulus.

* * * * *